3,249,401
PRODUCTION OF TITANIUM DIBORIDE

Anthony Arthur Robinson Wood, Dorking, Surrey, Peter Leslie Timms, Thornton Heath, Surrey, and George Herbert Bull, Barnet, England, assignors to United States Borax and Chemical Corporation, Los Angeles, Calif.
No Drawing. Filed May 10, 1962, Ser. No. 194,215
Claims priority, application Great Britain, May 15, 1961, 17,687/61
9 Claims. (Cl. 23—204)

This invention relates to the production of titanium diboride by the high temperature reaction of titanium dioxide, boric oxide and carbon.

This reaction is believed to proceed according to the equation:

$$TiO_2 + 5C + B_2O_3 = TiB_2 + 5CO$$

It may be carried out satisfactorily at temperatures of about 1350° C. and upwards, although in an atmosphere of carbon monoxide pure titanium diboride is not formed below about 1550° C. In practice, however, it is advantageous to operate at even higher temperatures, e.g. up to about 2000° C. Suitable furnaces in which the reaction can be carried out, which normally comprise a graphite tube as a reaction chamber, are expensive to construct and operate and it is important to make the most economical use of the heat employed. Because the reaction is endothermic, it is difficult to achieve this economy and this has hitherto been considered to be a serious disadvantage of the process.

It has previously been suggested that satisfactory operation depended on holding the reactants in boats or saggers, both of which waste available heat. An alternative proposal to carry out the reaction with the starting materials in the form of a slug made by heating a mixture of boric oxide, titanium dioxide, carbon and molasses or other carbonaceous binder enables the furnace to deal with a greater quantity of material and wastes less heat than when the reaction mixture is held in boats or saggers. The greatest mass can be introduced into the furnace in the form of solid cylindrical slugs but because of the endothermic reaction the best use of the available heat is not obtained.

It has now been found that by using slugs of special shape designed to give more efficient heat transfer from the furnace to the slug a given furnace can produce titanium diboride at a greater rate at any particular temperature. Such slugs can be lengths of reaction mixture of tubular section, channel section, cruciform section, star section or semi-circular section, with or without a corrugated surface. For ease of handling and manufacture a tubular section is preferred.

According to the invention titanium diboride is produced by heating at a temperature above 1350° C. a slug of shape such that the ratio of surface area to solid volume is at least 1.5 times, preferably 2.5 times, as great as that for a solid cylinder of the same length and of diameter equal to the maximum cross-sectional dimension of the slug, said slug comprising an intimate mixture of boric oxide, carbon and titanium dioxide. Preferably the slug has a longitudinal bore (such slugs herein being termed "tubular slugs") in which case the walls of the slug are advantageously of uniform thickness, as for example when the slug is cylindrical and the bore is also cylindrical and co-axial with it.

The preferred method of producing slugs for use in the invention comprises extruding or otherwise shaping into the desired shape an intimate mixture of carbon, titanium dioxide and boric oxide while heated to a temperature above that at which boric oxide softens and cooling the shaped product. The boric oxide then constitutes a glassy matrix for the particles of carbon and titanium dioxide. It is, however, to be understood that slugs produced with the aid of molasses or another carbohydrate binder may also be used. The boric oxide can be completely or partly replaced by a substance convertible to boric oxide on heating; for example boric acid may be used, but in such cases it must be converted to boric oxide before the slug is heated at the high temperatures required for the formation of titanium diboride; normally this conversion will be effected while the solid slug is being formed. For the sake of brevity only boric oxide will in the main be referred to in describing the invention in more detail, but it will be understood that whenever the context permits this term is used to include boric acid and other compounds which yield boric oxide on moderate heating.

In producing the slug, an intimate mixture of the components may be heated in a mould of the desired internal configuration, for example a cylindrical tube, at a temperature sufficient to convert the boric oxide into a glass. This temperature may be 300° to 1000° C., but is preferably 400° to 500° C., say 460° C. If boric acid is used, heating at this temperature will dehydrate it to boric oxide. While the boric oxide is being converted into a glass it may be subjected to lengthwise compression so as to yield a higher density slug for example of density at least 1.1 g./cc., preferably at least 1.4 g./cc. as described in Timms' application Serial No. 194,216 filed May 10, 1962. When the heating is complete the solid slug may be removed from the mould.

If a slug having a longitudinal bore is required, a pointed cylindrical or other rod may be driven into a solid slug produced in the above manner while it is laterally confined, preferably in the mould in which it is formed. This operation may be carried out at a temperature at which the material of the slug is more or less plastic without being fluid, preferably within the temperature range 400–800° C.

If desired, the material may also be longitudinally confined, as by the closed end of the mould at one end and at the other by a disc provided with a hole through which the rod can pass. It has been found that a rod of diameter up to about two thirds or even more of that of the slug can be used. Not only can this procedure produce a satisfactory bore without excessive risk of breakage or undue weakening of the slug, but it also serves to provide a slug of high density as is more particularly described in the aforesaid Timms application.

Tubular slugs may also be produced for example by extruding a mixture of the components heated to 400–1000° C., by cold pressing the mixture followed by heating to 400–500° C., by compression moulding at above 300° C., by jigging, or by drilling a preformed solid slug at room temperature.

The titanium dioxide is preferably employed in the form of anatase but other forms, for example mineral rutile or titanic oxide, may be used. Graphite is the preferred form of carbon although carbon black and other forms of carbon may be used, but it may then be necessary to use an inert atmosphere or lower temperatures to prevent oxidation of the carbon while the slug is being produced.

The boric oxide may be present in the slug in excess over the stoichiometric amount (calculated on the titanium dioxide); for example an excess up to 50% by weight can be tolerated, although it is preferably not more than 5–10% by weight. A slight excess of carbon over the stoichiometric amount is advantageous, but this should not exceed 5% by weight and is preferably 1–3% by weight.

It is important that the materials used in producing the slug are intimately mixed, since otherwise consistently good results are not obtained. Thorough mixing in a ball mill will give a satisfactory mixture.

In the production of titanium diboride by the process of the invention the slugs are heated to temperatures above about 1350° C. and especially 1550°–2000° C. or higher. An inert gas, e.g. argon, may be employed to sweep out the carbon monoxide formed, although it is preferred to carry out the reaction at a temperature above 1550° C., preferably above 1700° C., in an atmosphere of carbon monoxide and to quench the product as rapidly as possible.

The invention is illustrated in the following examples.

*Example I*

An intimate mixture of graphite, boric acid and anatase was produced by ball milling together —200 mesh graphite powder and the other components in proportions corresponding to a 1% excess of graphite and a 15% excess of boric acid over the stoichiometric amount.

The mixture, dampened with about 8% of water was packed into a steel tube of internal diameter 1¼ inches. The filled tube was heated in an oven at 450° C. for 1 hour to dehydrate the boric acid. After this time, the steel tube, still containing the dehydrated mixture, was removed from the oven. The hot mixture in the tube was then compressed with a ram loosely fitting the tube under a pressure of 200 lbs. per sq. in. The slug thus formed was pushed out of the tube and allowed to cool. The density of the slug was 1.6 g./cc.; its length was 9 inches.

A 0.8 inch hole was bored along the axis of the slug with a steel twist drill of diameter 0.8 inch.

The formation of titanium diboride was effected in an electric furnace with a 1½ inch bore graphite reaction tube. The slug was heated in an inert atmosphere in the reaction tube for 9 minutes at 1910° C., after which the product was pushed into a cooled part of the furnace. The product was a friable grey powder containing 98.2% $TiB_2$.

A similar slug, density 1.6 g./cc. but with no hole bored through it, took 29 minutes to react at the same temperature.

*Example II*

A dampened mixture of boric acid, titanium dioxide and graphite was packed into a 2 inch bore tube and heated to 450° C. for 1¼ hrs. to dehydrate the boric acid, as described in the first part of Example I.

The mixture, heated in this way, formed a slug of density 0.78 g./cc. This slug was pushed from the tube in which it was formed while still hot into a 2 inch bore heated split die tube. A steel spike with a maximum shank size of 1½ inches was then driven through the axis of the slug under a load of 500 lbs. The spike was pulled out and the tubular slug so formed was removed by opening the split die. The slug had a density of 1.6 g./cc., and a length of 9 inches.

Titanium diboride was produced from the slug by heating it in an inert atmosphere in an electric furnace with a 2½ inch bore graphite reaction tube. The slug was heated for 11 minutes at 1940° C. before being pushed into a cold zone of the furnace. The product was a friable grey powder containing 97.5% of $TiB_2$.

A slug of the same dimensions but without a hole through it and having a density of 0.79 g./cc. took 40 minutes to react at 1940° C.

We claim:

1. In the process for producing titanium diboride by heating at a temperature above 1350° C. a preformed slug of reactants comprising an intimate mixture of boric oxide, carbon and titanium dioxide, the improvement which comprises employing as said slug a tubular slug having a longitudinal bore.

2. The process of claim 1 in which said tubular slug has a ratio of surface area to solid volume of at least 2.5 times as great as that for a solid cylinder of length and diameter equal to the length and external diameter of said slug.

3. The process of claim 1 in which said preformed slug comprises particles of titanium dioxide and carbon dispersed in a glassy matrix of boric oxide.

4. A process according to claim 1, wherein the slug contains an excess of boric oxide of not more than 10% by weight over the stoichiometric amount and an excess of carbon of 1 to 3% by weight over the stoichiometric amount.

5. A process according to claim 1, wherein the carbon is in the form of graphite.

6. In the process for producing titanium diboride by heating at a temperature above 1350° C. a preformed slug of reactants comprising an intimate mixture of boric oxide, carbon and titanium dioxide, the improvement which comprises forming said slug by shaping said mixture of reactants into a tubular slug having a longitudinal bore while heating said mixture at a temperature of at least that at which boric oxide softens, and cooling said tubular shaped slug.

7. The process of claim 6 in which said slug is shaped in the form of a cylindrical tube.

8. The process of claim 6 in which said tubular slug is shaped while heating said mixture at a temperature of 400°–800° C.

9. In the process for producing titanium diboride by heating at a temperature of at least 1550° C. a preformed slug of reactants comprising an intimate mixture of boric oxide, carbon and titanium dioxide, the improvement which comprises forming said slug by heating said mixture of reactants at a temperature of 400°–800° C. while in a tubular shape and boring a longitudinal hole in said slug to remove the central core.

References Cited by the Examiner

UNITED STATES PATENTS

| | | | |
|---|---|---|---|
| 2,792,310 | 5/1957 | Steinberg et al. | 106—43 |
| 3,019,084 | 1/1962 | Amstein | 23—204 |

BENJAMIN HENKIN, *Primary Examiner.*